(12) United States Patent
Barcin et al.

(10) Patent No.: US 9,021,791 B2
(45) Date of Patent: May 5, 2015

(54) METHOD FOR DIAGNOSING A METERING VALVE AND DEVICE FOR CARRYING OUT THE METHOD

(71) Applicant: Robert Bosch GmbH, Stuttgart (DE)

(72) Inventors: Buelent Barcin, Kirchheim/Jesingen (DE); Christian Walz, Durmersheim (DE); Tobias Pfister, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/866,535

(22) Filed: Apr. 19, 2013

(65) Prior Publication Data

US 2013/0276429 A1    Oct. 24, 2013

(30) Foreign Application Priority Data

Apr. 19, 2012   (DE) .................. 10 2012 206 430

(51) Int. Cl.

| | |
|---|---|
| *F01N 3/00* | (2006.01) |
| *F01N 3/02* | (2006.01) |
| *F01N 3/10* | (2006.01) |
| *F01N 3/20* | (2006.01) |
| *F01N 3/18* | (2006.01) |
| *F01N 11/00* | (2006.01) |
| *F02D 41/22* | (2006.01) |

(52) U.S. Cl.
CPC . *F01N 3/18* (2013.01); *Y02T 10/47* (2013.01); *F01N 3/208* (2013.01); *F01N 11/00* (2013.01); *F01N 2550/05* (2013.01); *F01N 2900/1622* (2013.01); *F01N 2900/1814* (2013.01); *F01N 2900/1821* (2013.01); *F01N 2900/1822* (2013.01); *F02D 41/221* (2013.01); *Y02T 10/40* (2013.01); *Y02T 10/24* (2013.01)

(58) Field of Classification Search
USPC .................. 60/274, 277, 295, 324
See application file for complete search history.

(56) References Cited

U.S. PATENT DOCUMENTS

| | | | |
|---|---|---|---|
| 2006/0168941 | A1 | 8/2006 | Pfaeffle et al. |
| 2009/0159132 | A1 | 6/2009 | Gerlach |
| 2009/0159135 | A1* | 6/2009 | Kolbenschlag ............... 137/82 |
| 2009/0192732 | A1 | 7/2009 | Huebner |
| 2011/0219747 | A1* | 9/2011 | Geveci et al. ................. 60/274 |
| 2011/0259290 | A1* | 10/2011 | Michikawauchi et al. ... 123/1 A |

FOREIGN PATENT DOCUMENTS

| | | |
|---|---|---|
| DE | 10043798 | 3/2002 |
| DE | 10139142 | 2/2003 |
| DE | 10360891 | 7/2005 |
| DE | 102004061247 | 6/2006 |

(Continued)

*Primary Examiner* — Audrey K Bradley
*Assistant Examiner* — Dapinder Singh
(74) *Attorney, Agent, or Firm* — Michael Best & Friedrich LLP

(57) ABSTRACT

A method for diagnosing a metering valve for metering a reagent into the exhaust gas region of an internal combustion engine. The metering valve is actuated by a pulse-width-modulated metering valve actuation signal with a certain duty factor for setting the metering rate. A reagent pump places the reagent at a reagent pressure, and the reagent pump is operated with a pulse-width-modulated pump actuation signal with a certain duty factor. Diagnosis of the metering valve is carried out on the basis of an evaluation of the increase in the metering valve actuation signal pulse duty factor after a pre-defined increase in the metering rate. The reagent filling level of an SCR catalytic converter arranged in the exhaust gas region is taken into account. At the start of the diagnosis, the reagent storage capacity of the SCR catalytic converter is checked.

7 Claims, 3 Drawing Sheets

(56) References Cited

FOREIGN PATENT DOCUMENTS

| | | |
|---|---|---|
| DE | 102005001119 | 7/2006 |
| DE | 102006025257 | 12/2007 |
| DE | 102008005989 | 7/2009 |
| DE | 102008043469 | 5/2010 |
| DE | 102009000097 | 7/2010 |

* cited by examiner

METHOD FOR DIAGNOSING A METERING VALVE AND DEVICE FOR CARRYING OUT THE METHOD

BACKGROUND OF THE INVENTION

The invention is based on a method for diagnosing a metering valve which defines a metering rate of a reagent which is to be metered into an exhaust gas region of an internal combustion engine, and of an apparatus for carrying out the method.

The subject matter of the present invention also comprises a computer program and a computer program product.

DE 101 39 142 A1 describes an exhaust gas treatment device of an internal combustion engine in which, in order to reduce the NOx emissions, an SCR (Selective Catalytic Reduction) catalytic converter is used which reduces the nitrogen oxides contained in the exhaust gas to nitrogen with the reducing agent ammonia. The ammonia is acquired in the exhaust gas region of the internal combustion engine from a urea hydrous solution which is sprayed into the exhaust gas region upstream of the SCR catalytic converter. The urea hydrous solution which is stored in a reservoir tank is placed at a predefined reagent pressure with a pump. In order to meter the urea hydrous solution as a function of the demand, a metering valve is provided which is set to a predefined throughflow rate.

Laid-open patent application DE 10 2005 001 119 A1 provides a diagnosis of valves that are used in an arrangement which meters fuel as a reagent in the exhaust gas region of an internal combustion engine. The oxidizable hydrocarbons are provided for heating an exhaust gas treatment device. The diagnosis provides for the reagent pressure which occurs between a reagent safety valve and a reagent metering valve to be monitored. The reagent pressure is measured during different switched states of the reagent safety valve and of the reagent metering valve. A diagnosis step provides for the reagent to be placed at a predefined reagent setpoint pressure. Afterwards, checking is carried out with the closed valves to determine that a drop in pressure of the reagent does not exceed a predefined pressure gradient.

Laid-open patent application DE 10 2004 061 247 A1 provides for comprehensive diagnosis of valves which are used in an arrangement which also meters fuel as a reagent into the exhaust gas region of an internal combustion engine. The reagent pressure which occurs in the reagent center path between a reagent safety valve and a reagent metering valve is measured in different switched states of the valves. A diagnosis step also provides here that after the closing of the valves it is checked whether a drop in pressure of the reagent occurs which is evaluated with respect to whether the drop in pressure does not exceed a predefined pressure gradient.

Laid-open patent application DE 103 60 891 A1 describes a method for diagnosing a metering valve, which defines a throughflow rate of a reagent which is to be introduced into an exhaust gas region of an internal combustion engine. The reagent which is placed at a predefined pressure by a pump is fed to the metering valve, wherein the pressure is detected by a pressure sensor. The diagnosis provides for a measure of throughput quantity to be evaluated during a diagnosis time. After the occurrence of a diagnosis starting signal, the metering valve is closed and the reagent is placed at a predefined diagnosis starting pressure by means of a pump. The metering valve is subsequently set to a predefined throughflow rate and the pressure difference occurring during the diagnosis time is evaluated. A first configuration provides for the diagnosis time to be permanently predefined and for faults to be detected if the pressure difference during the fixed diagnosis time exceeds a predefined pressure difference limiting value. It is alternatively possible to provide that the pressure difference is permanently predefined and that faults are detected if the diagnosis time exceeds a predefined diagnostic time limiting value. The reagent pressure which a pressure sensor detects is evaluated.

Laid-open patent application DE 10 2008 005 989 A1 describes an SCR system in which the reagent is placed at a reagent setpoint pressure by a pump. The pump contains an overflow valve which, when the set reagent setpoint pressure is reached, opens in the metering mode, with the result that an overflow to the suction inlet of the pump can take place. The overflow valve is implemented as a diaphragm which is clamped against a spring. A metering valve which defines the metering rate of the reagent is metered by evaluating a drop in pressure of the reagent. During the diagnosis, the pump is firstly switched off. Metering is subsequently carried on during a diagnosis metering mode, wherein the metered reagent quantity is determined in the diagnosis metering mode and the evaluation of the pressure drop is not ended until a metering quantity threshold value is reached.

Laid-open patent application DE 10 2009 000 097 A1 describes an SCR system which is less sensitive to contamination. In order to clean a reagent, a first filter is provided upstream of a reagent metering module and a second filter is provided upstream after a valve. A further filter and a throttle (not settable) for limiting the return flow rate are present in a return line which leads from the reagent pump back to the reservoir tank.

The invention is based on the object of specifying a method and a device for carrying out the method which permit diagnosis of a metering valve which defines a metering rate of a reagent which is to be metered into an exhaust gas region of an internal combustion engine.

SUMMARY OF THE INVENTION

The procedure according to the invention for diagnosing a metering valve which sets the metering rate of a reagent to be metered into the exhaust gas region of an internal combustion engine, which metering valve is actuated by a pulse-width-modulated metering valve actuation signal with a certain metering valve actuation signal pulse duty factor for setting the metering rate, in which a reagent pump places the reagent at a reagent pressure, and in which the reagent pump is operated with a pulse-width-modulated pump actuation signal with a certain pump actuation signal pulse duty factor, wherein the diagnosis of the metering valve is carried out on the basis of the evaluation of an increase in the pump actuation signal pulse duty factor after a predefined metering rate increase, is defined by the fact that the reagent filling level of an SCR catalytic converter arranged in the exhaust gas region is taken into account, that before an metering rate increase at the start of the diagnosis a check is provided as to whether the SCR catalytic converter has a reagent storage capacity which is sufficient for the diagnosis, in order to be able to store the additional metering quantity which occurs during the diagnosis, and that the diagnosis is carried on only if this is the case.

The procedure according to the invention permits diagnosis of the metering valve of an SCR metering system in that a reaction of the reagent pump after an increase in a stimulated metering rate is evaluated. The metering valve is considered to be functionally capable if the reagent pump has to provide an increased delivery capacity when the metering rate increase is stimulated.

The stimulated intervention into the pulse-width-modulated metering valve actuation signal provides for an increase in the pulse duty factor which is defined as a ratio of the duration of the switch-on level to the period duration. As a result of the relative prolongation of the switch-on level, an increased metering rate is predefined during the diagnosis.

Accordingly, the reagent pump has to provide an increased delivery capacity with the same reagent pressure, as a result of which the pulse duty factor of the pulse-width-modulated pump actuation signal is increased. The increase in the pump actuation signal pulse duty factor is evaluated on the basis of a comparison with a difference threshold value. The difference threshold value can be defined in a variable fashion as a function of the metering rate increase. The underlying relationship between the stimulated increase in the pulse duty factor of the metering valve actuation signal and the expected increase in the pulse duty factor of the pump actuation signal is preferably determined experimentally and the difference threshold value is correspondingly defined.

The invention ensures that the metering rate increase which occurs during the diagnosis does not lead to an undesired breakdown of the reagent, for example ammonia, downstream of the SCR catalytic converter. The diagnosis is continued only if the reagent storage capability of the SCR catalytic converter is at a value at which the additional storage of the additional quantity which is caused by the metering is still possible. If this is not ensured, the diagnosis is not continued.

One refinement provides that the temperature of the SCR catalytic converter is taken into account in the determination of the reagent storage capability since the reagent storage capability of an SCR catalytic converter depends on the temperature.

One refinement provides that at least when a sufficient reagent storage capability is not present, a reduction in the reagent filling level in the SCR catalytic converter is provided. If appropriate, the reduction can always be provided before the diagnosis, independently of the reagent filling level. The reduction is achieved by reducing the metering rate or by brief complete deactivation of the metering valve.

Additionally or alternatively it is possible, at least in the case of an excessively low reagent storage capability, to provide an increase in the NOx raw emissions of the internal combustion engine. In the present case, the increase in the NOx raw emissions of the internal combustion engine is desired because as a result more rapid reduction of the reagent filling level in the SCR catalytic converter occurs as a result of consumption of the stored reagent.

A first possibility provides, for this purpose, a reduction in an exhaust gas recirculation rate at the start of the diagnosis. The exhaust gas recirculation rate influences the NOx raw emissions of the internal combustion engine. A relatively low exhaust gas recirculation rate corresponding to a relatively low addition of inert gas to the combustion mixture increases the peak temperatures occurring during the combustion of the fuel and as a result increases the NOx raw emissions. If appropriate, the reduction in the exhaust gas recirculation rate can always be provided before the diagnosis, independently of the reagent filling level. The reduction in the exhaust gas recirculation rate is achieved by closing an exhaust gas recirculation valve.

Another possibility provides, for this purpose, intervention into the fuel metering device of the internal combustion engine with a fuel change signal. By changing the injection time and/or the fuel quantity of the at least one fuel injection it is possible to achieve a higher peak temperature during the combustion of the fuel, associated with the increase in the NOx raw emissions.

The device according to the invention for carrying out the method firstly relates to a specially configured control unit which contains means for carrying out the method.

The control unit contains, in particular, a memory for the pulse-width-modulated pump actuation signal as a well as a diagnostics controller.

The control unit preferably contains at least one other electrical memory in which the method steps are stored as a control unit program.

The computer program according to the invention provides for all steps of the method according to the invention to be carried out when it runs on a computer.

The computer program product according to the invention having a program code which is stored on a machine-readable carrier carries out the method according to the invention when the program runs on a computer.

Exemplary embodiments of the invention are illustrated in the drawing and explained in more detail in the following description.

DETAILED DESCRIPTION

Figure 1:
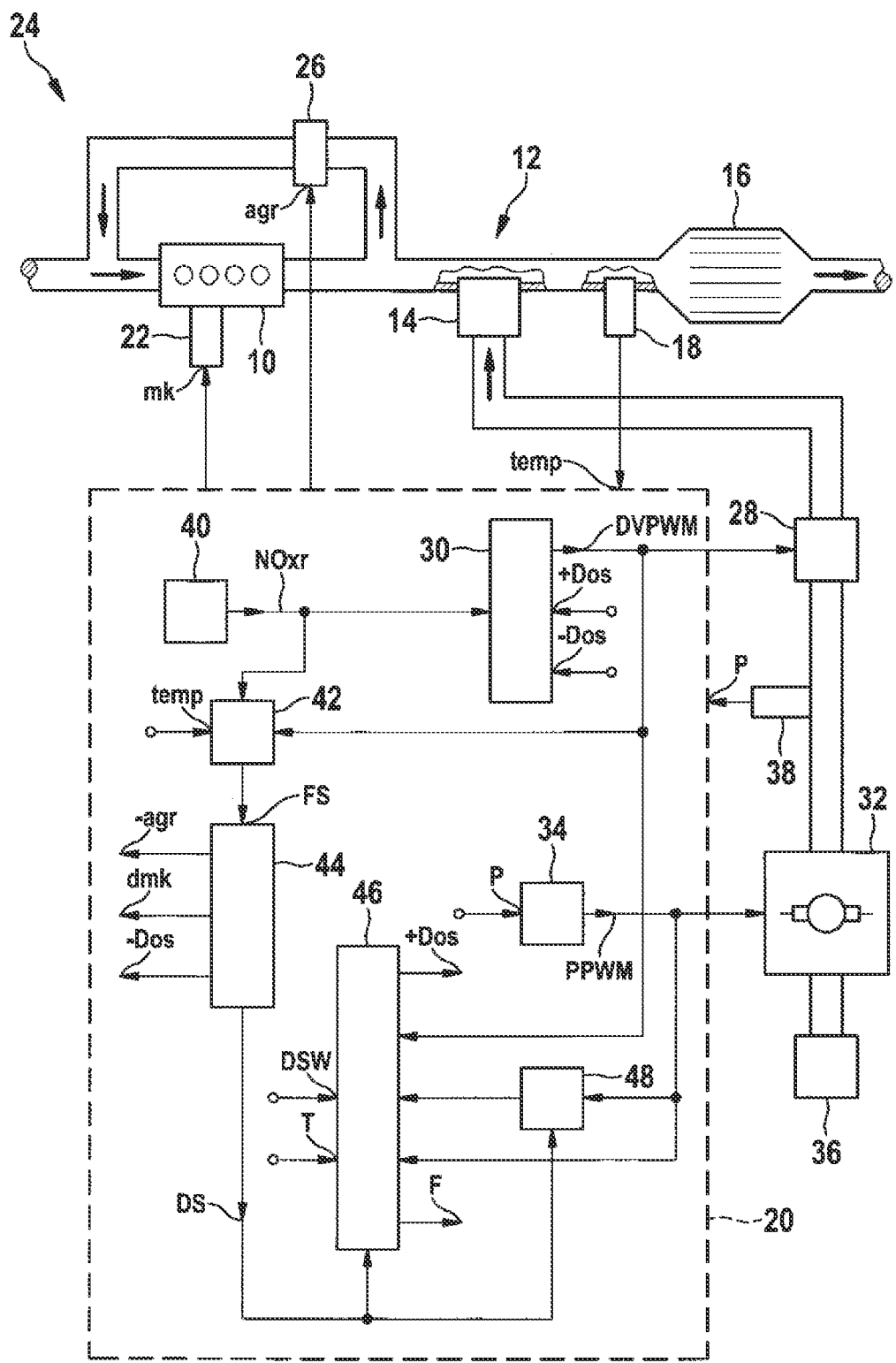
FIG. 1 shows a technical environment in which a method according to the invention is running.

FIG. 1 shows an internal combustion engine 10 in the exhaust gas region 12 of which a metering device 14 and an SCR catalytic converter 16 are arranged. The SCR catalytic converter 16 is assigned a temperature sensor 18 which outputs a temperature signal temp to a control unit 20.

The internal combustion engine 10 is assigned a fuel metering device 22 to which the control unit 20 makes available a fuel signal mK. An exhaust gas recirculation device 26, to which the control unit 20 makes available an exhaust gas recirculation signal agr, is arranged between the exhaust gas region 12 and an intake region 24 of the internal combustion engine 10.

The metering device 14 meters a reagent upstream of the SCR catalytic converter 16, wherein the metering rate is defined, in particular, by a metering valve 28. The metering valve 28 can be contained in the metering device 14 or can be arranged separately therefrom, positioned, for example, in a metering valve. A pulse-width-modulated metering valve actuation signal DVPWM is applied to the metering valve 28 by a metering valve actuation means 30.

A pump 32, to which a pulse-width-modulated pump actuation signal PPWM is applied by a pump actuation means 34 delivers a reagent which is stored in a reagent tank 36 and places the reagent at a reagent pressure p, which is measured with a pressure sensor 38 and made available to the control unit 20. A urea hydrous solution, which is a precursor of the actual reagent ammonia required in the SCR catalytic converter 16, can be provided as a reagent.

The control unit 20 contains a NOx raw emission determining means 40 which makes available the determined NOx raw emissions NOxr both to the metering valve actuation means 30 and to a filling level determining means 42.

The pulse-width-modulated metering valve actuation signal DVPWM can be made available to the filling level determining means 42 as an alternative to or in addition to the NOx raw emissions NOxr. Furthermore, the temperature signal temp is fed to the filling level determining means 42. The filling level determining means 42 calculates the reagent filling level FS which is present in the SCR catalytic converter 16 and which is made available to a first comparator 44. The first comparator 44 compares the reagent filling level FS to a filling level threshold value FSSW. If the filling level threshold value FSSW is exceeded, the first comparator 44 outputs an exhaust gas recirculation reduction signal agr and/or a fuel change signal dmk. If the reagent filling level FS does not exceed the filling level threshold value FSSW, the first comparator 44 makes available a diagnosis start signal DS which is made available to a diagnostics controller 46 and to a memory 48.

The pulse-width-modulated pump actuation signal PPWM is made available to the memory 48 and is also fed to the diagnostics controller 46. Furthermore, a difference threshold value DSW and a waiting time T are made available to the diagnostics controller 46. The diagnostics controller 46 outputs a metering rate increase +Dos, which is made available to the metering valve actuation means 30.

The method according to the invention for diagnosing the metering valve 28 is explained in more detail with reference to the flowchart represented in FIG. 2 and the signal profiles shown in FIGS. 3a and 3b.

The metering valve 28 essentially determines the metering rate of the reagent or of the precursor of the reagent to be metered into the exhaust gas region 12 of the internal combustion engine 10, wherein the precursor is, for example, a urea hydrous solution from which the ammonia which is necessary for the selective catalytic reaction is formed in the exhaust gas region 12 or directly in the SCR catalytic converter 16. The metering valve 28 is actuated by the pulse-width-modulated metering valve actuation signal DVPWM which has a certain metering valve actuation signal pulse duty factor DCDV for setting the desired metering rate. The period duration and/or the pulse duration of the pulse-width-modulated metering valve actuation signal DVPWM can be defined in such a way that the metering valve 28 be continuously adjusted or defined in such a way that the metering valve 28 opens and closes completely within one period, with the result that an average metering rate is produced.

The reagent pump 32 places the reagent stored in the reagent tank 36 at a reagent pressure p. The pulse-width-modulated pump actuation signal PPWM, which has a pump actuation signal pulse duty factor DCP, is applied to the reagent pump 32 by the pump actuation means 34. The pump actuation signal pulse duty factor DCP is defined as a function of the reagent pressure p.

The diagnosis of the metering valve 28 is based on a comparison of the pulse-width-modulated metering valve actuation signal DVPWM with the pulse-width-modulated pump actuation signal PPWM in the case of an increase in the metering valve actuation signal pulse duty factor dDCDV and subsequent evaluation of the increase in the pump actuation signal pulse duty factor dDCP as a result.

Within the scope of the diagnosis, a metering rate increase +Dos is always assumed so that at any time a sufficient conversion of the NOx raw emissions NOxr of the internal combustion engine 10 is ensured.

According to the invention there is provision that the reagent filling level FS of the SCR catalytic converter 16 which is arranged in the exhaust gas region 12 is taken into account and that before the increase in the metering valve actuation signal pulse duty factor dDCDV at the start of the diagnosis it is tested whether the SCR catalytic converter 16 has a reagent storage capacity which is sufficient for the diagnosis, in order to be able to store the additional metering quantity which occurs during the diagnosis. The diagnosis is then carried out only when the required storage capacity is available.

Figure 2:
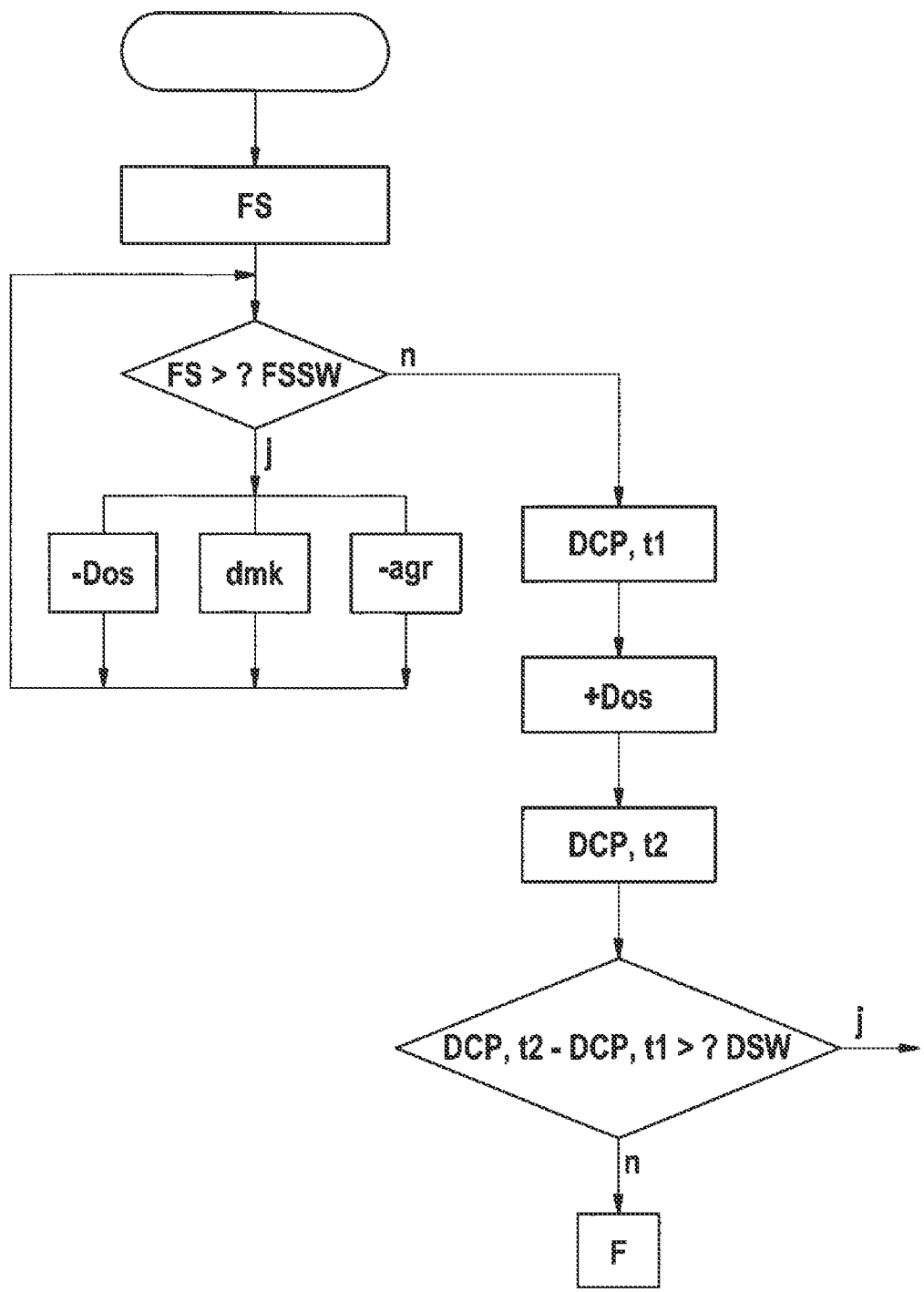
FIG. 2 shows a flowchart of a method according to the invention.
Figure 3A:
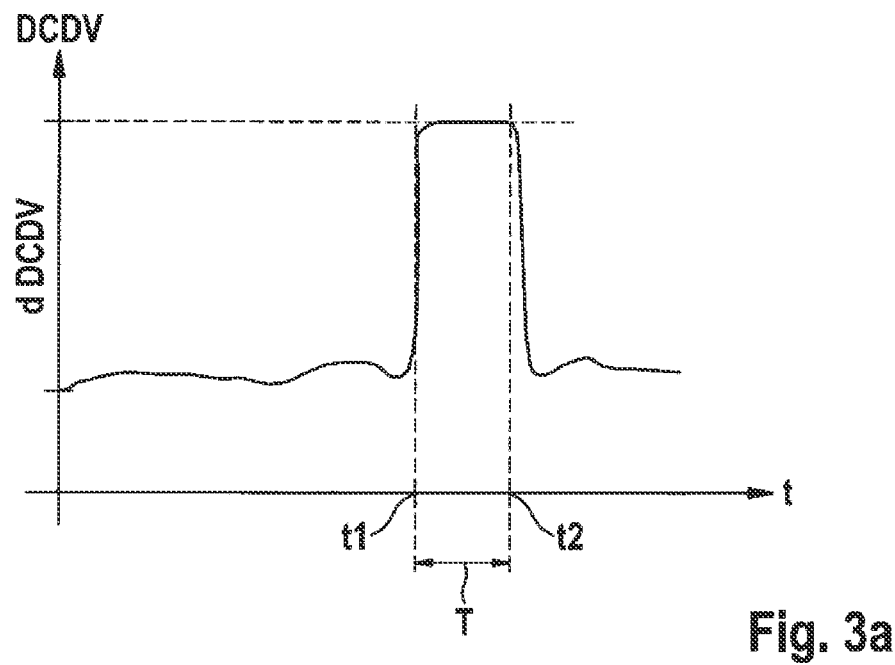
FIG. 3a shows a metering valve actuation signal pulse duty factor.

At the start of the diagnosis, according to the flowchart shown in FIG. 2 the reagent filling level FS in the SCR catalytic converter 16 is therefore firstly determined and compared with the filling level threshold value FSSW in the first comparator 44. If the filling level threshold value FSSW is exceeded, the diagnosis cannot be carried out at first. In this case, a plurality of possibilities for bringing about suitable starting conditions for the diagnosis are available to the first comparator 44.

A first possibility is to reduce the metering rate with the metering rate reducing means Dos which is made available to the metering valve actuation means 30, in response to which the latter reduces, for example, the metering valve actuation signal pulse duty factor DCDV and outputs the resulting pulse-width-modulated metering valve actuation signal DVPWM, which causes the metering valve 28 to set a lower metering rate.

Alternatively or additionally, the first comparator 44 can bring about the increase in the NOx raw emissions NOxr of the internal combustion engine 10. The objective of this measure is to reduce the reagent filling level FS in the SCR catalytic converter 16 by consumption of the reagent through the increased conversion demand.

A first possibility for increasing the NOx raw emissions NOxr is by changing the fuel signal mK by means of the fuel change signal dmk, wherein, in particular, intervention is made into the timing of the at least one partial injection, preferably a plurality of partial injections, for example in such a way that the highest possible compression of the level of the injected fuel is achieved, at which level high peak temperatures and therefore high NOx raw emissions NOxr occur.

A further possibility for increasing the NOx raw emissions NOxr is to intervene in the exhaust gas recirculation signal agr by means of the exhaust gas recirculation reduction signal—agr. When the exhaust gas recirculation is reduced or completely shut down less inert gas is conveyed from the exhaust gas region 12 to the intake region 24, with the result that the peak temperature during the combustion of the fuel also rises, associated with a rise in the NOx raw emissions NOxr.

If the first comparator 44 detects in the corresponding interrogation that the reagent filling level FS no longer exceeds the filling level threshold value FSSW, the first comparator 44 outputs the diagnosis start signal DS which causes the memory 48 for storing the pulse-width-modulated pump actuation signal PPWM which is present at that time and from which the diagnostics controller 46 determines the pump actuation signal pulse duty factor DCP at a first time t1 at which the diagnosis continues with the increasing of the metering rate.

Furthermore, the diagnostics controller 46 increases the metering rate of the reagent at the first time t1 with the metering rate increase +Dos, which is made available to the metering valve actuation means 30. The metering rate increase +Dos brings about the increase in the metering valve actuation signal pulse duty factor dDCDV which is shown in FIG. 3a and which can either be permanently predefined or defined as a function of the currently present pulse-width-modulated metering valve actuation signal DVPWM. For the sake of variable definition, the pulse-width-modulated metering valve actuation signal DVPWM is made available to the diagnostics controller 46.

After the expiry of a waiting time T, which is defined in such a way that stable conditions of the reagent metering system can be expected, the diagnostics controller 46 detects the current pulse-width-modulated pump actuation signal PPWM occurring with the expiry of the waiting time T at the second time t2.

Figure 3B:
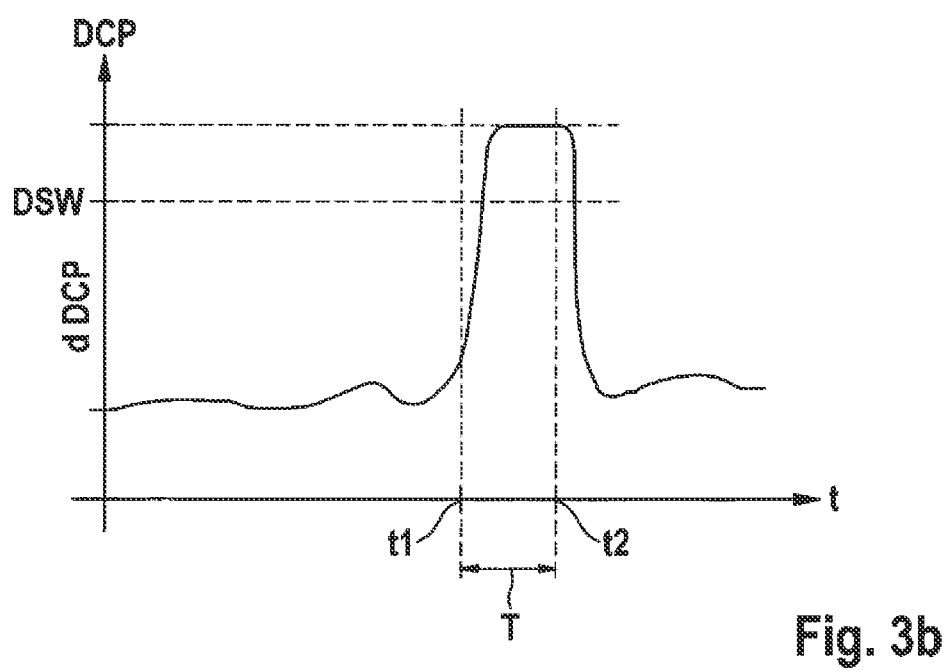
FIG. 3b shows a pump actuation signal pulse duty factor.

In the diagnostics controller 46, the pump actuation signal pulse duty factor DCP is evaluated and the increase in the pump actuation signal pulse duty factor dDCP which is illustrated in FIG. 3*b* is determined. In a second comparator, contained in the metering controller 46, the increase in the pump actuation signal pulse duty factor dDCP is compared with a difference threshold value DSW.

The difference threshold value DSW can be embodied in a variable fashion or as a fixed value. A fixed value is provided if the metering rate increase +Dos is also a permanently predefined value.

If the second comparator which is contained in the diagnostic controller 46 determines, in accordance with the last interrogation shown in FIG. 2, that the difference threshold value DSW is exceeded, it is assumed that there is a functionally capable metering valve 28 because the increased metering rate has been correctly reflected in an increase in the delivery capacity of the reagent pump 32 and therefore in an increase in the pump actuation signal pulse duty factor dDCP. This case is shown in FIG. 3*b*.

However, if it is detected in the second comparator that the increase in the pump actuation signal pulse duty factor dDCP has not reached the difference threshold value DSW, the diagnostics controller 46 outputs a fault signal F which can be displayed or which is stored in a memory.

After the termination of the diagnosis, the usual metering mode is resumed at the earliest at the second time t2.

What is claimed is:

1. A method for diagnosing a metering valve that is configured to control a metering rate for metering a reagent into an exhaust gas region of an internal combustion engine, the method comprising:
   providing, by a pump, a reagent to the metering valve at a reagent pressure value based on a pulse width modulated ("PWM") pump actuation signal;
   determining, by a control unit, the PWM pump actuation signal;
   determining, by the control unit, a reagent filling level of a selective catalytic reduction ("SCR") catalytic converter;
   comparing, by the control unit, the reagent filling level with a first threshold value;
   storing, by the control unit, a first value of the PWM pump actuation signal in a memory if the reagent filling level is less than the first threshold value;
   increasing, by the metering valve, the metering rate after storing the first value of the PWM pump actuation signal;
   storing, by the control unit, a second value of the PWM pump actuation signal in the memory upon expiration of a time period following increasing the metering rate; and
   comparing, by the control unit, a difference between the first value and the second value of the PWM pump actuation signal with a second threshold value.

2. The method according to claim 1, wherein the filling level of the SCR catalytic converter is determined based at least in part on a temperature of the SCR catalytic converter.

3. The method according to claim 1, further comprising reducing, by the control unit, the reagent filling level in the SCR catalytic converter if the reagent filling level is less than or equal to the first threshold value.

4. The method according to claim 3, wherein reducing the reagent filling level in the SCR catalytic converter includes increasing a NOx raw emissions of the internal combustion engine.

5. The method according to claim 4, wherein increasing the NOx raw emissions of the internal combustion engine includes reducing an exhaust gas recirculation.

6. The method according to claim 4, wherein increasing the NOx raw emissions of the internal combustion engine includes an intervention into a fuel-metering device of the internal combustion engine is provided with a fuel change signal with which the injection time and/or the fuel quantity is changed in order to achieve a higher peak temperature during the combustion of the fuel.

7. An exhaust gas treatment system, comprising:
   an internal combustion engine;
   an exhaust gas region including a selective catalytic reduction ("SCR") catalytic converter;
   a metering valve configured to control a metering rate for metering a reagent into the exhaust gas region;
   a reagent tank;
   a pump configured to deliver the reagent from the reagent tank to the metering valve at a reagent pressure value based on a pulse width modulated ("PWM") pump actuation signal; and
   a control unit including a memory and configured to
      determine the PWM pump actuation signal,
      determine a reagent filling level of the SCR catalytic converter,
      compare the reagent filling level with a first threshold value,
      store a first value of the PWM pump actuation signal in the memory if the reagent filling level is less than the first threshold value,
      increase the metering rate of the metering valve after determining the first PWM pump actuation signal value,
      store a second value of the PWM pump actuation signal upon expiration of a time period following increasing the metering rate, and
      compare a difference between the first value and the second value of the PWM pump actuation signal with a second threshold value.

* * * * *